(12) United States Patent
Odaohara

(10) Patent No.: US 7,956,578 B2
(45) Date of Patent: Jun. 7, 2011

(54) POWER SUPPLY HAVING A REDUCED NUMBER OF SWITCHING ELEMENTS

(75) Inventor: Shigefumi Odaohara, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 740 days.

(21) Appl. No.: 11/746,635

(22) Filed: May 9, 2007

(65) Prior Publication Data
US 2007/0262651 A1 Nov. 15, 2007

(30) Foreign Application Priority Data
May 9, 2006 (JP) .................. 2006-129864

(51) Int. Cl.
*H02J 7/00* (2006.01)
(52) U.S. Cl. ......... 320/116; 320/126; 320/163; 323/284
(58) Field of Classification Search .................. 320/107, 320/116, 126
See application file for complete search history.

(56) References Cited

U.S. PATENT DOCUMENTS

| | | | | |
|---|---|---|---|---|
| 4,885,521 A | * | 12/1989 | Crampton | 320/126 |
| 5,804,944 A | * | 9/1998 | Alberkrack et al. | 320/163 |
| 5,929,602 A | * | 7/1999 | Suzuki | 320/116 |
| 5,936,440 A | * | 8/1999 | Asada et al. | 327/110 |
| 6,119,179 A | * | 9/2000 | Whitridge et al. | 710/72 |
| 6,476,795 B1 | * | 11/2002 | Derocher et al. | 345/163 |
| 2006/0187689 A1 | * | 8/2006 | Hartular | 363/63 |

FOREIGN PATENT DOCUMENTS

| | | |
|---|---|---|
| JP | 11-196541 | 7/1999 |
| JP | 2000-032682 | 1/2000 |
| JP | 2001-268813 | 9/2001 |
| JP | 2004-304976 | 10/2004 |
| JP | 2005-341769 | 12/2005 |

* cited by examiner

*Primary Examiner* — Edward Tso
*Assistant Examiner* — Arun Williams
(74) *Attorney, Agent, or Firm* — Ference & Associates LLC

(57) ABSTRACT

There is provided a power supply capable of reducing switching elements. In a power supply, an AC/DC adapter 121 supplies electric power to a load 125 and a battery charger 122. The battery charger comprises a high side FET 102 and a low side FET 103 which operate according to a synchronous rectification method, and charges batteries 108 and 109. When a commercial power supply fails, a power outage detection circuit provided in the battery charger detects the power outage, and outputs a power outage signal. The battery charger which has received the power outage signal sets the high side FET to be ON KEEP. A discharge current from the battery flows via a discharge path 119. This enables a reduction in the number of FETs in comparison with other power supplies.

14 Claims, 5 Drawing Sheets

POWER SUPPLY HAVING A REDUCED NUMBER OF SWITCHING ELEMENTS

CLAIM FOR PRIORITY

This application claims priority from Japanese Patent Application No. 2006-129864, filed May 9, 2006, and which is hereby incorporated by reference as if fully set forth herein.

FIELD OF THE INVENTION

The present invention relates to a power supply which supplies electric power to a load while charging a battery when commerically supplied electric power (a commercial power supply) is available and which supplies electric power from a battery to a load when a commerical power supply is not available. More particularly, the present invention relates to a power supply having a topology that has reduced the number of switching elements.

BACKGROUND OF THE INVENTION

A notebook personal computer (hereinafter, referred to as a notebook PC) available in a mobile environment is typically equipped with a charging-type battery. In an environment in which a commercial power supply can be used (i.e., in an office or at home), a battery is charged while electric power is supplied to a load by using an AC/DC adapter connected to the commercial power supply. In an environment in which a commercial power supply cannot be used, electric power is supplied by switching to a battery feed so as not to interrupt power supplied to a load.

Japanese Unexamined Patent Publication (Kokai) No. 2004-304976 provides a disclosure of a power supply system which supplies electric power from an AC adapter to a circuit in a set while charging one piece of battery. Japanese Unexamined Patent Publication (Kokai) No. 2000-32682 provides a disclosure of a power supply system which supplies electric power from DC-IN to an electric power consumption device while charging two pieces of batteries.

FIG. 1 is a block diagram of a power supply system generally adopted in a notebook PC. An AC/DC adapter 10 converts an AC voltage to a DC voltage, and supplies electric power to a load 14 according to a path 11. An FET 1 and either an FET 8 or an FET 9 are set to be ON while charging. In addition, an FET 5 or an FET 7 is set to be ON corresponding to the FET 8 or the FET 9. An FET controller 17, an FET 2 and an FET 3 configure a battery charger. The FET controller 17 performs switching control of the FET 2 and the FET 3 in a synchronous rectification method, and converts the DC voltage generated by the AC/DC adapter 10 to a DC voltage suitable for charging. Electric power generated by the AC/DC adapter 10 is supplied to the load 14 while charging according to the path 11, and is supplied to a battery 15 or a battery 16 for charging according to a path 12 or a path 13. When the power feed is switched from a commercial power supply to a battery, the FET 1 is set to be OFF, the FET 8 or the FET 9 corresponding to the battery being charged is set to be OFF, and an FET 4 or an FET 6 is set to be ON. Electric power is supplied from a battery while charging to the load 14 according to a path 18 or a path 19. Nine FETs are used in the power supply system shown in FIG. 1.

FIG. 2 is a block diagram of another power supply system which has also conventionally been adopted in a notebook PC. In FIG. 2, the same reference numerals are attached to the same elements as FIG. 1. In the power supply system in FIG. 2, there are eight FETs, which is one fewer than the number of FETs used in the power supply system of FIG. 1. From the power supply system in FIG. 2, the FET 8 and the FET 9 in FIG. 1 are removed and an FET 20 is provided therein in order to configure a discharge path for flowing an electric current from the battery to the load 14. The FET 20 is set to be ON while discharging to pass discharge current, and is set to be OFF while charging so that the voltage of the battery charger can be applied to the battery effectively.

In view of the foregoing, a need has been recognized in connection with improving upon the shortcomings and difficulties of conventional efforts to reduce the reduced number of switching elements in a power supply while maintaining the function of the power supply.

SUMMARY OF THE INVENTION

There are broadly contemplated herein, in accordance with at least one presently preferred embodiment of the present invention, new apparatus and systems for a power supply having a topology with a reduced number of switching elements.

In summary, one aspect of the invention provides a system comprising: a power outage detection circuit which detects that an output voltage of a DC voltage source has been lowered, and outputs a power outage signal; a battery charger comprising a switching element which adjusts the output voltage generated by the DC voltage source, in performing a switching operation, and is set to be ON KEEP in response to the power outage signal; and a battery which is charged by the battery charger and supplies the electric power to the load when the switching element is set to be ON KEEP.

Another aspect of the invention provides an apparatus comprising: a power outage detection circuit which detects that an output voltage of a DC voltage source has been lowered, and outputs a power outage signal; a battery charger comprising a high side FET and a low side FET which operate in a synchronous rectification method, and the high side FET is set to be ON KEEP in response to the power outage signal; a first charge/discharge path connected to the output of the battery charger; a second charge/discharge path connected to the output of the battery charger; a first battery connected to the first charge/discharge path; and a second battery connected to the second charge/discharge path.

A further aspect of the invention provides a system comprising: an electronic device; a power outage detection circuit which detects that an output voltage of a DC voltage source has been lowered, and outputs a power outage signal; a battery charger comprising a switching element which adjusts the output voltage generated by the DC voltage source, in performing a switching operation, and is set to be ON KEEP in response to the power outage signal; and a battery which is charged by the battery charger and supplies the electric power to the load when the switching element is set to be ON KEEP.

Furthermore, an additional aspect of the invention provides an apparatus comprising: an electronic device; a power outage detection circuit which detects that an output voltage of a DC voltage source has been lowered, and outputs a power outage signal; a battery charger comprising a high side FET and a low side FET which operate in a synchronous rectification method, and the high side FET is set to be ON KEEP in response to the power outage signal; a first charge/discharge path connected to the output of the battery charger; a second charge/discharge path connected to the output of the battery charger; a first battery connected to the first charge/discharge path; and a second battery connected to the second charge/discharge path.

DETAILED DESCRIPTION OF THE INVENTION

Figure 1:
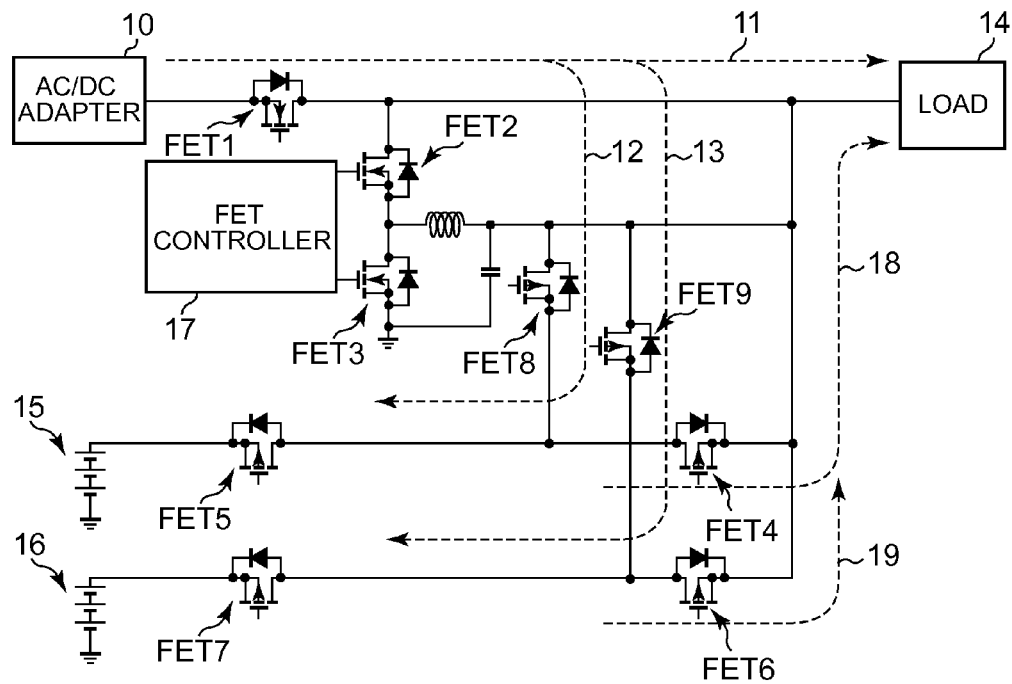
FIG. 1 is a block diagram of an existing power supply system.

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

The power supply system according to the present invention has a topology that can reduce the number of switching elements in a power supply system which charges a battery while supplying electric power to a load by a commercial power supply, and supplies electric power from a battery to a load when a commercial power supply cannot be used. The principle of the present invention consists in a point to include a battery charger in a discharge path through which a discharge current from the battery flows. This configuration enables to reduce the number of switching elements less than that of an existing power supply system which does not include a battery charger in a discharge path from a battery. If a battery charger is formed to include a diode in which an anode is connected to a battery side and a cathode is connected to a load side, a voltage of the load will never be instantaneously interrupted, when a power supply source to a load is switched from a DC voltage source connected to a commercial power supply to a battery.

When a switching element contains the FET, it is possible to use a parasitic diode of the FET as a diode. When discharge current is flowed through the parasitic diode of the FET for a long time, the FET is overheated, therefore, when a power outage signal is outputted from a power outage detection circuit, the FET is set to be ON KEEP. ON KEEP means that unlike the ON state in switching operation, the FET is kept to be ON while the discharge current is flowed from a battery to a load. When the FET contains a high side FET and a low side FET which are operated in a synchronous rectification method, the high side FET is set to be ON KEEP, after a power outage signal is outputted and a predetermined delay time elapses. A predetermined delay time is provided for preventing a short-circuit current from flowing with the high side FET and the low side FET turned ON simultaneously. Or the high side FET is set to be ON KEEP in response to the power outage signal, provided that the low side FET is set to be OFF.

Figure 3:
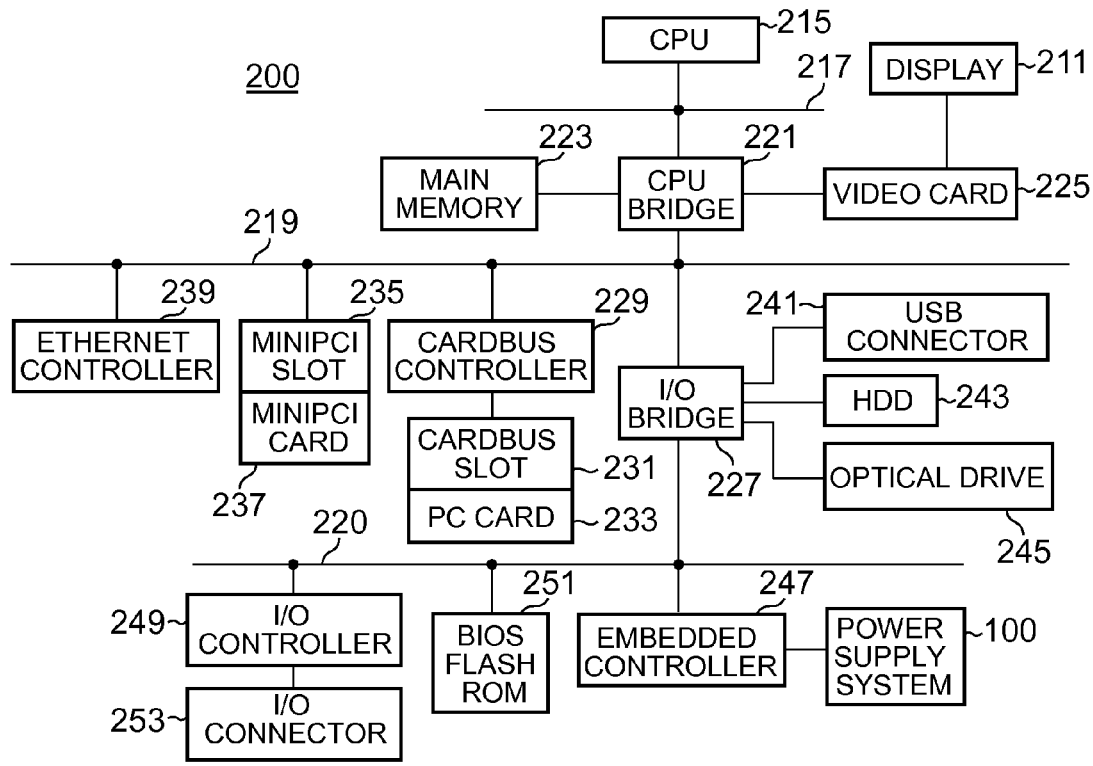
FIG. 3 is a block diagram showing the schematic configuration of a notebook PC equipped with a power supply system according to an embodiment of the present invention.

FIG. 3 is a block diagram showing the schematic configuration of a notebook PC 200 having a power supply system according to an embodiment of the present invention. A liquid crystal display (LCD) 211 is a display unit to a user of the notebook PC 200. A CPU 215 is an operation processing unit serving as the nucleus function of the notebook PC 200 and executes an OS, BIOS, a device driver, or an application program. The CPU 215 is connected to each device via three stages of buses, such as an FSB (Front Side Bus) 217 as a system bus, a PCI (Peripheral Component Interconnect) bus 219 for performing communication between the CPU 215 and peripheral equipments, and an LPC (Low Pin Count) bus 220 which is an interface in place of an ISA bus, and transmits and receives a signal.

The FSB 217 and the PCI bus 219 communicate with each other by a CPU bridge 221 referred to as a memory/PCI chip. The CPU bridge 221 is configured so as to include a memory controller function for controlling access operation to a main memory 223 and a data buffer function for buffering a difference in data-transfer speed between the FSB 217 and the PCI bus 219. The main memory 223 is a writable memory used as a reading area of a program executed by the CPU 215 and a working area for writing processing data. A video card 225 includes a video chip and VRAM (both are not shown), which generates an image to be drawn upon receiving a drawing command from the CPU 215 and transmits the same to a display 211 as drawing data.

The PCI bus 219 is connected to an I/O bridge 227, a CardBus controller 229, a miniPCI slot 235, and an Ethernet (registered trademark) controller 239, respectively. The Card-Bus controller 229 is a controller for controlling data transfer between the PCI bus 219 and a PC card 233. A CardBus slot 231 is connected to the CardBus controller 229, and on the CardBus slot 231, the PC card 233 is mounted. A miniPCI card 237 having incorporated, for example, a wireless LAN module is mounted on the miniPCI slot 235. The Ethernet (a registered trademark) controller 239 is a controller for connecting the notebook PC 200 to a LAN.

The I/O bridge 227 has a bridge function between the PCI bus 219 and the LPC bus 220. In addition, the I/O bridge 227 has an IDE (Integrated Device Electronics) interface function, to which a hard disk drive (HDD) 243 and an optical drive 245 (CD drive, DVD drive, or the like) are connected. Further, a USB connector 241 is connected to the I/O bridge 227. An embedded controller 247, a BIOS flash ROM 251, and an I/O controller 249 are connected to the LPC bus 220. An I/O connector 253 is connected to the I/O controller 249.

The embedded controller 247 is a microcomputer containing a CPU, a ROM, and a RAM, and has an A/D input terminal, a D/A output terminal, and a digital input/output terminal including plural channels. To the embedded controller 247, a power supply system 100 is connected via input/output terminals thereof. The power supply system 100 is configured including an AC adapter, a battery, and a battery charger, and is controlled by the embedded controller 247.

Figure 4:
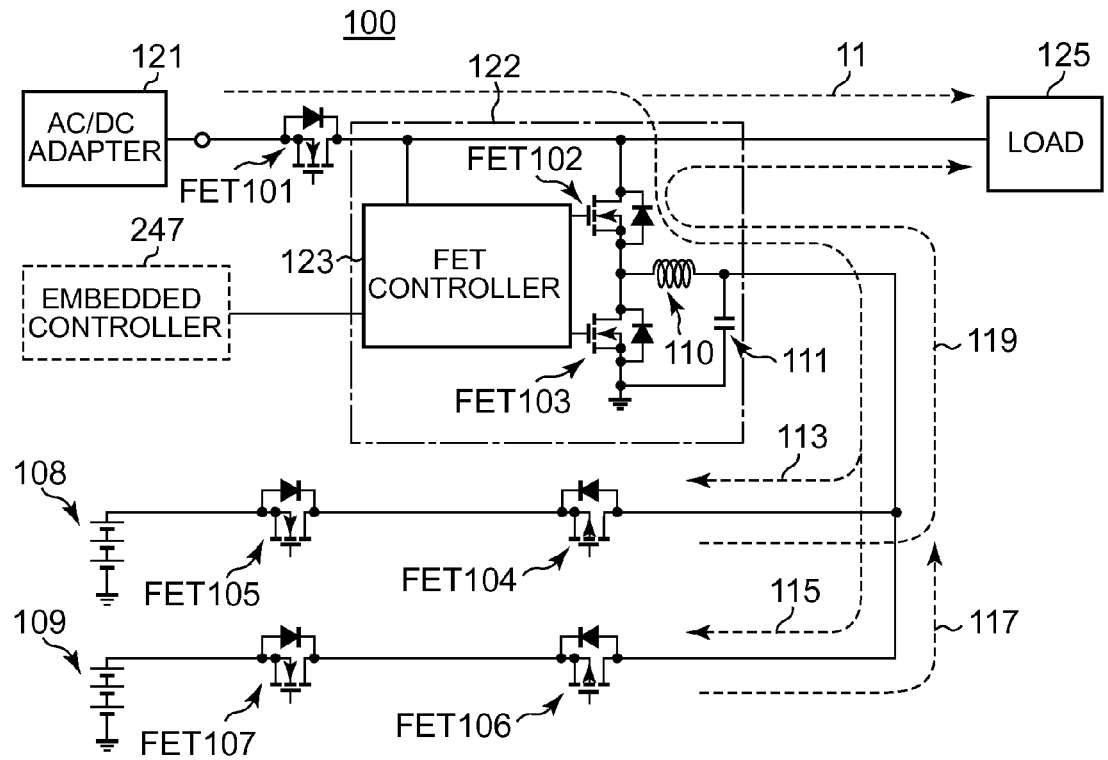
FIG. 4 is a block diagram showing the configuration of a power supply system according to an embodiment of the present invention.

FIG. 4 is a block diagram showing the configuration of the power supply system 100 according to an embodiment of the present invention. The power supply system 100 mainly contains an AC/DC adapter 121 as a DC voltage source, batteries 108 and 109, a battery charger 122 charging batteries, and a load 125 receiving electric power supply from the AC/DC adapter 121 or the batteries 108 and 109. The power supply system 100 is operated in both operation modes, a charging mode charging a battery while supplying electric power to the load 125 and a discharging mode supplying electric power, from a battery to a load.

The AC/DC adapter 121 is configured as an exterior device of the notebook PC 200. The AC/DC adapter 121 has one end connected to the outlet of a commercial power supply and the other end connected to the notebook PC 200. The AC/DC adapter 121 may be incorporated in the inside of the notebook PC 200. After having converted an AC voltage to a DC voltage, the AC/DC adapter 121 supplies electric power to the load 125 and the battery charger 122. An FET 101 contains an N channel MOSFET and is set to be OFF when electric power is supplied from the battery 108 or 109 to the load 125, so that a discharge current may prevent an electric current from flowing into the AC/DC adapter 121.

The battery charger 122 includes an FET controller 123, a high side FET 102, a low side FET 103, an inductor 110, and a capacitor 111.

Both the high side FET 102 and the low side FET 103 are N channel MOSFETs. In the high side FET 102, a parasitic diode in which the anode is connected to the battery side and the cathode is connected to the load side is internally formed. In the low side FET 103, a parasitic diode in which the anode is connected to the ground side and the cathode is connected to the high side FET 102 side is internally formed. The FET controller 123 performs switching controls of the high side FET 102 and the low side FET 103 so as to repeat ON and OFF alternately, resulting in realization of the synchronous rectification method, and thereby adjusts the output voltage generated by the AC/DC adapter 121 to a predetermined voltage suitable for charging of the battery. However, the FET controller 123 controls the high side FET 102 and the low side FET 103 to prevent a short-circuit current from flowing with the high side FET 102 and the low side FET 103 turned ON simultaneously.

The inductor 110 and the capacitor 111 smooth output current by discharging energy stored in the period in which the high side FET 102 is OFF, and the low side FET 103 is ON. The load 125 includes many devices shown in FIG. 3. The load 125 includes a DC-DC converter for controlling voltage supplied to the devices and a capacitor maintaining voltage supplied just for a short time when the voltage is lowered instantaneously. The battery 108 is configured as a battery pack stored in a case and is stored on a battery-dedicated bay of the notebook PC 200. The battery 109 is also configured as a battery pack stored in a case and is selectively stored on a shared bay of the notebook PC 200 with an optical drive or an auxiliary HDD.

The battery 108 and the battery 109 may be battery packs including an IC or a temperature sensor in conformity with the standards referred to as the Smart Battery System (SBS) proposed by Intel Corporation and Duracell Corporation in the United States. The battery 108 is connected to the output of the battery charger 122 via a charge/discharge path configured by a discharge controlling FET 104 and a charge controlling FET 105. The battery 109 is connected to the output of the battery charger 122 via a charge/discharge path configured by a discharge controlling FET 106 and a charge controlling FET 107. The discharge controlling FETs 104 and 106 are P-channel type MOSFETs, and the charge controlling FETs 105 and 107 are N-channel type MOSFETs. Within these FETs, parasitic diodes are formed, both in the directions illustrated, respectively.

The embedded controller 247 is connected to the FET controller 123. The embedded controller 247 is a part of the load 125, and controls operation of the power supply system 100. When the output voltage of the AC/DC adapter 121 is maintained at the predetermined value, the embedded controller 247 transmits a signal to the FET controller 123 to allow the battery charger 122 to perform charging operation. When the output voltage of the AC/DC adapter 121 declines below the predetermined value, the embedded controller 247 renders the battery charger 122 to halt charging operation, by transmitting a signal to the FET controller 123. The embedded controller controls operation of the FETs 101, 104, 105, 106, and 107 in order to realize the charging mode and the discharging mode.

Figure 5A:
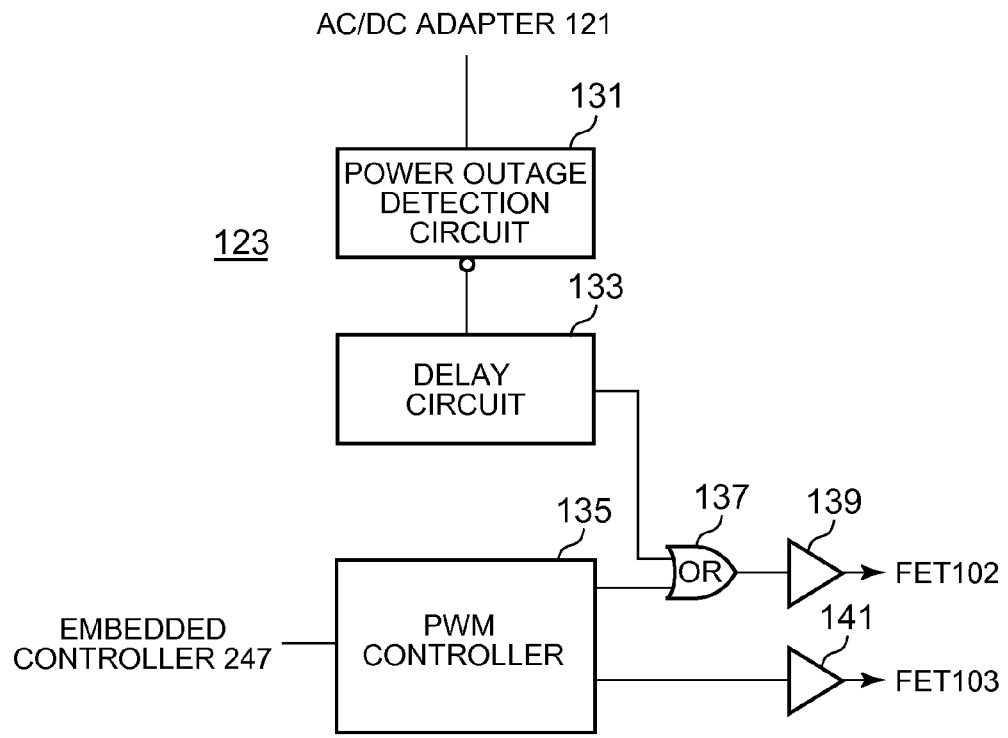
FIG. 5A is a diagram showing the inner configuration of an FET controller.
Figure 5B:
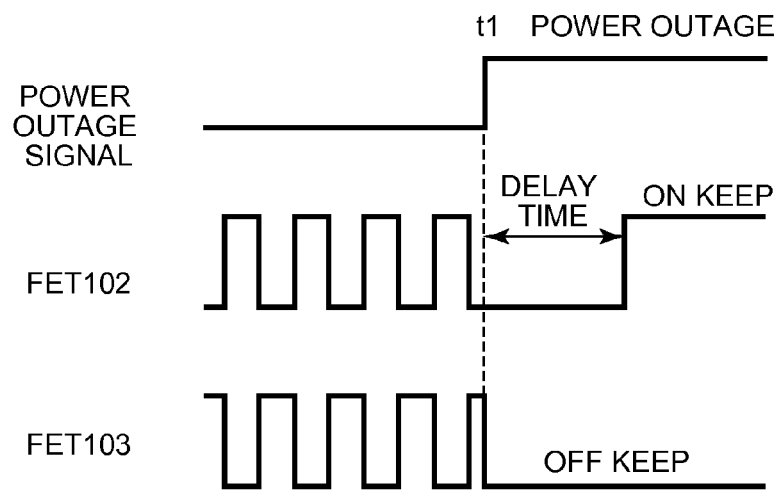
FIG. 5B is a diagram showing waveforms when an electric current is switched from the charging mode to the discharging mode.

FIG. 5A is a block diagram showing the inner configuration of the FET controller 123, and FIG. 5B shows signal waveforms showing the state of switching a mode from the charging mode to the discharging mode. A power outage detection circuit 131 receives the output voltage of the AC/DC adapter 121 to output a power outage signal. The output of the power outage detection circuit 131 is connected to a delay circuit 133. The power outage detection circuit 131 negates the power outage signal at the output end thereof while the output voltage of the AC/DC adapter 121 is equal to or more than the predetermined value. When the AC/DC adapter 121 is extracted from an outlet of a commercial power supply or a power outage occurs in a commercial power supply resulting in decline in the output voltage of the AC/DC adapter 121 below the predetermined value, the power outage detection circuit 131 asserts the power outage signal at the output end thereof. Hereinafter, the state that the output voltage of the AC/DC adapter 121 declines below the predetermined value will be assumed to mean that a power outage has occurred. The delay circuit 133 outputs the power outage signal received from the power outage detection circuit 131 as an FET control signal to an OR logic device 137, after delay for a predetermined time.

On receiving a signal of start or stop of charging from the embedded controller 247, a PWM controller 135 operates to output an FET control signal for operating drivers 139 and 141. When a power outage occurs and the power supply system 100 is switched from the charging mode to the discharging mode, the embedded controller 247 halts operation of the PWM controller 135. When either an FET control signal outputted from the delay circuit 133 or an FET control signal outputted from the PWM controller 135 is asserted, the OR logic device 137 supplies the output to the driver 139. The driver 139 converts the FET control signal outputted from the OR logic device 137 to the operating voltage of the FET 102 to output the same to a gate of a high side FET 102. Having converted the FET control signal outputted from the PWM controller 135 to the operating voltage of the low side FET 103, the driver 141 output the same to the gate of the low side FET 103.

The operation of the power supply system 100 will be described based on FIGS. 4 and 5. A battery pack including the battery 108 is stored on a dedicated bay in the notebook PC 200, and a battery pack including the battery 109 is stored on a shared bay thereof. It is assumed that one end of the AC/DC adapter 121 is connected to the commercial power supply, while the other end thereof being connected to the notebook PC 200, and that the load 125 consumes electric power. By determining that the output voltage of the AC/DC adapter 121 lies within a predetermined range, the embedded controller 247 sets the FET 101 to be ON, and transmits a signal of start of operation to the PWM controller 135. The PWM controller 135 outputs a signal for rendering the high side FET 102 and the low side FET 103 to perform switching operation of turning ON and OFF alternately. The duty ratio of the switching operation is determined based on the output voltage of the AC/DC adapter 121 and the voltage of the batteries 108 and 109 required for charging at the time of starting of charging.

In addition, the embedded controller 247 determines whichever to charge, the battery 108 or the battery 109. In the power supply system 100 according to this embodiment, any one of the battery 108 and the battery 109 is selected while charging. According to the present invention, it is possible to adopt a simultaneous charging method for charging the battery 108 and the battery 109 at the same time. At this time, the embedded controller 247 is assumed to be set as to charge the battery 108 first. Therefore, the embedded controller 247 sets the FETs 104 and 105 to be ON, and the FETs 106 and 107 to be OFF. Since the output voltage of the AC/DC adapter 121 is equal to or more than the predetermined value, the power outage detection circuit 131 negates the power outage signal generated at the output end thereof.

While the power outage signal is being negated at the output end of the power outage detection circuit 131, the output of the delay circuit 133 is also negated, and therefore, this does not affect the output of the OR logic device 137. Thus, the high side FET 102 operates according to the output of the PWM controller 135. The PWM controller 135 detects the output voltage of the AC/DC adapter 121 and the output voltage of the battery charger 122 using the voltage sensor, not shown, and adjusts the output voltage of the battery charger 122 to the predetermined range by adjusting the duty ratio of the high side FET 102. In this state, a load current flows from the AC/DC adapter 121 to the load 125 via a line 11, and charging current flows to the battery 108 via a line 113. When the embedded controller 247 selects the battery 109 as the object of charging, the FETs 104 and 105 are set to be OFF, while the FETs 106 and 107 are set to be ON, and thereby, a charging current flows to the battery 109 via a line 115.

Here, when a power outage occurs, the embedded controller 247 detects the same, and then, sets the FET 101 to be OFF and halts the operation of the PWM controller 135. Since the FETs 104 and 105 are set to be ON, a discharge path to the load from the battery 108 is formed. In this embodiment of the present invention, the circuit of the battery charger 122 is included in the discharge path supplying electric power from the battery 108 or 109 to the load 125 in the discharging mode. Specifically, an electric current is supplied from the battery 108 to the load 125 through the high side FET 102 via a line 119. If a power outage occurs when the battery 109 is charged, an electric current is supplied from the battery 109 to the load 125 through the high side FET 102 via a line 117.

Therefore, after a power outage occurs, it is necessary to set the high side FET 102 to be ON KEEP, and the low side FET to be OFF KEEP. ON KEEP means that the high side FET 102 is continuously to be ON in the discharging mode unlike the ON state in switching operation. A meaning of OFF KEEP of the low side FET is similar to the above.

At the moment the PWM controller 135 stops operation in response to an operation stop signal from the embedded controller 247, the ON and OFF states of the high side FET 102 and the low side FET 103 which have been performing switching operation are in uncertainty, and therefore, the low side FET 103 may be ON and the high side FET 102 may be OFF. In addition, the voltage remains in the AC/DC adapter 121 for a short time after a power outage, and the voltage stored in a capacitor remains in the load 125. If the high side FET 102 is set to be ON just after the power outage signal is asserted from the power outage detection circuit 131, the high side FET 102 and the low side FET 103 are set to be ON at the same time, and a short-circuit current can flow from the AC/DC adapter 121 and the load 125 towards a ground.

In an embodiment of the present invention, after the predetermined delay time has elapsed since a power outage has occurred and the power outage detection circuit 131 has asserted the power outage signal, the delay circuit 133 outputs the FET control signal to the OR logic device 137 to prevent a short-circuit current from being generated. FIG. 5B shows the operation state of the power outage signal and the operation states of the FETs 102 and 103 when a power outage occurs at time t1. The high side FET 102 and the low side FET 103 perform switching operation until the time t1 so as to repeat ON and OFF synchronized alternately. After the predetermined delay time of 10μ seconds has elapsed from the time t1, the high side FET 102 is set to be ON KEEP. The low side FET 103 is set to be OFF KEEP according to the output of the PWM controller 135.

The ON period of the low side FET 103 may change according to change in the duty ratio, and time to become OFF KEEP since power outage has occurred may fluctuate. However, since the delay time is set to be longer than the maximum time possible to keep the low side FET 103 to be ON, the low side FET 103 is inevitably set to be OFF KEEP before the high side FET 102 becomes to be ON KEEP.

The high side FET 102 is kept to be OFF until the delay time elapses. However, since an electric current discharged from the battery 108 flows through the parasitic diode of the high side FET 102, it is not possible that the voltage supplied to the load 125 at the time an electric current is switched from a charging mode to a discharging mode is reduced. When an electric current is flowed to a parasitic diode for a long time, heat is generated. However, since, after the delay time has elapsed, the high side FET 102 is set to be ON KEEP, the electric current stops flowing to the parasitic diode. If the time during flow of the electric current is approximately only the delay time necessary for realizing this embodiment, heat generation in the parasitic diode does not become a problem. In addition, since a voltage drop in the parasitic diode is small, only 1V, the lowered voltage during the period that the discharging current flows from the parasitic diode is not so large either as to disturb the operation of the load. When the service recovers from the power outage, the embedded controller 247 detects the recovery, sets the FET 101 to be ON so as to supply electric power to the load 125, and operates the PWM controller 135 to start charging of the battery.

Figure 2:
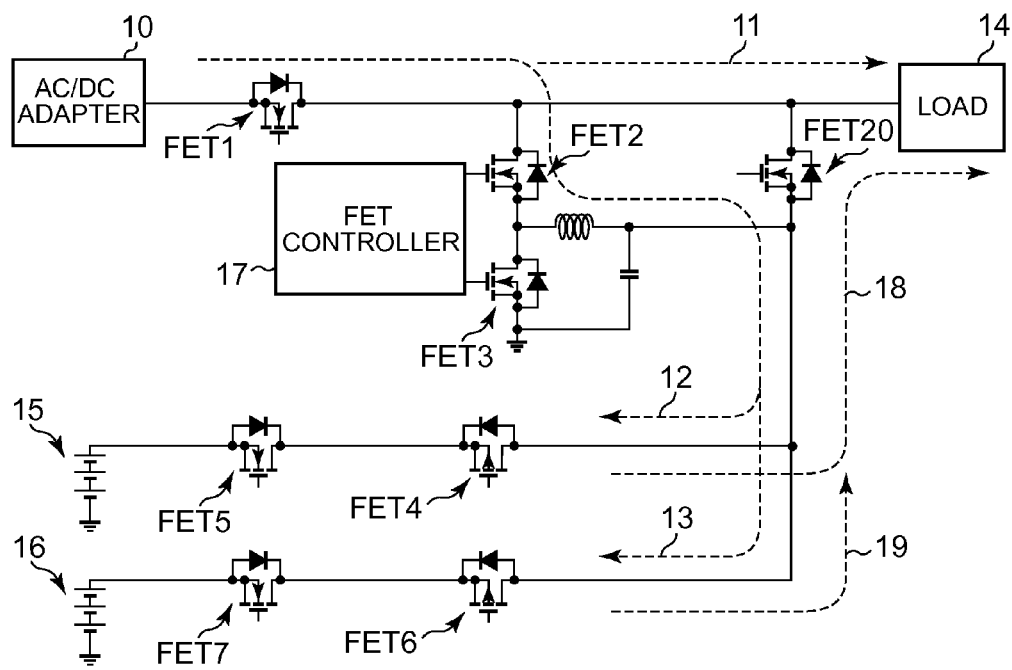
FIG. 2 is a block diagram of an existing power supply system.

The power supply system 100 shown in FIG. 4 is different from the existing power supply system in FIG. 2 in that the FET 20 is removed and the battery charger 122 is included in the discharge path. The FET 20 in FIG. 2 was needed for applying the output voltage of the battery charger to the battery while charging. In the power supply system 100 in FIG. 4, the place corresponding to the FET 20 in FIG. 2 is separated from a circuit, and therefore, even if the FET 20 is removed, it will not detrimental to charging. And, this system is configured so that any trouble can not occur either in the discharge path to the load by forming a discharge path from the battery that was formed by the FET 20 using the battery charger 122.

Figure 6A:
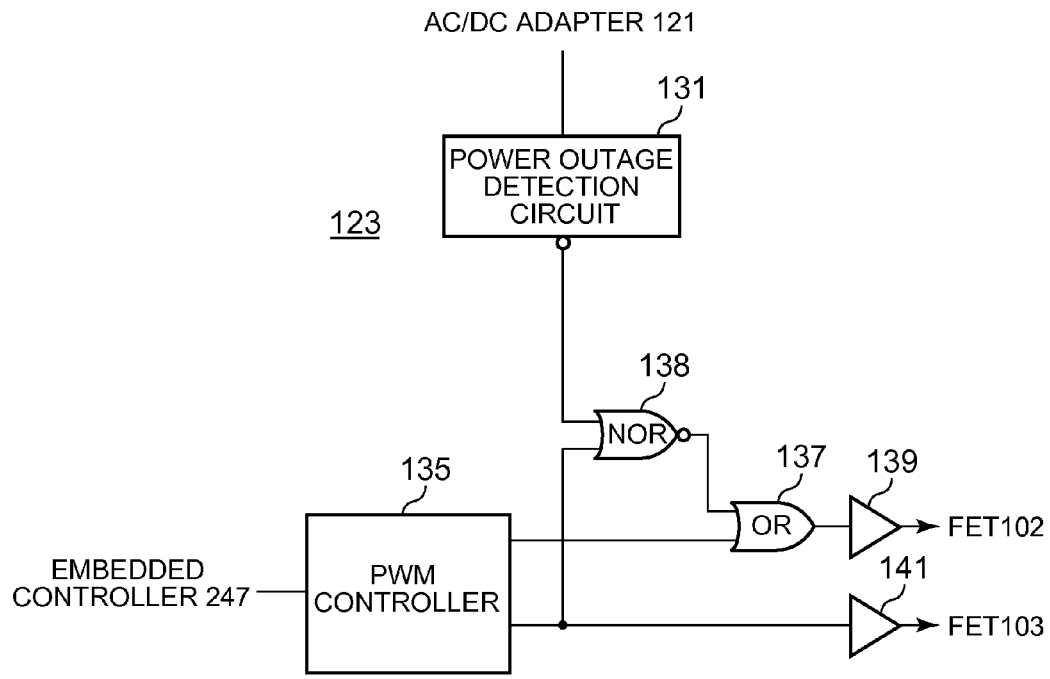
FIG. 6A is a diagram showing the inner configuration of an FET controller.
Figure 6B:
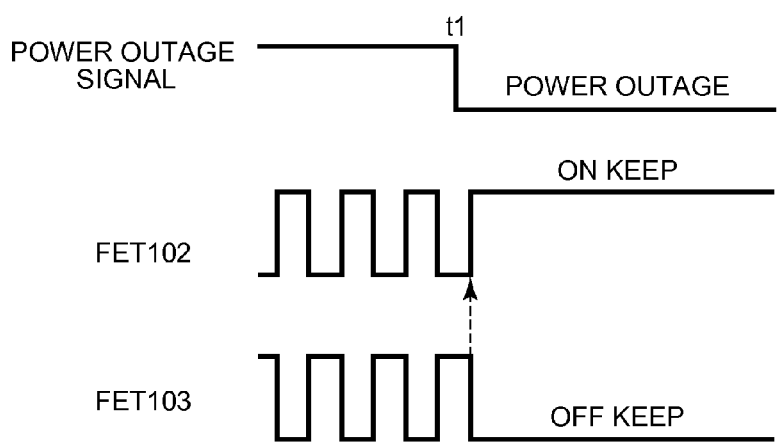
FIG. 6B is a diagram showing waveforms when an electric current is switched from the charging mode to the discharging mode.

Another embodiment in which an electric current is switched from the charging mode to the discharging mode will be described with reference to FIGS. 6A and 6B. FIG. 6A is a block diagram showing the inner configuration of the FET controller 123, and FIG. 6B shows signal waveforms showing the state in switching the electric current from the charging state to the discharging state. It is necessary to control the high side FET 102 and the low side FET 103 so as not to be turned ON at the same time, in order to switch the electric current from the charging mode to the discharging mode in the topology using the battery charger 122 for the discharge path. However, the methods in FIGS. 6A and 6B use a NOR logic device 138 in place of the delay circuit 133 of FIG. 5. One input of the NOR logic device 138 is connected to the output of the power outage detection circuit 131, and the other input thereof is connected to the output of the PWM controller 135 to the driver 141. The output of the NOR logic device 138 is connected to one input of the OR logic device 137.

In FIG. 6A, when the output voltage of the AC/DC adapter 121 is equal to or more than the predetermined value, the power outage detection circuit 131 asserts the power outage signal, and when a power outage occurs, the same negates the power outage signal. If a power outage occurs at the time t1, the PWM controller 135 stops operation and the low side FET 103 is brought into the OFF KEEP state before long. When the power outage signal is negated and the FET control signal of the PWM controller 135 to the driver 141 sets the FET 103 to be OFF KEEP, the NOR logic device 138 outputs the output thereof to the OR logic device 137. Thus, the high side FET 102 is set to be ON KEEP, provided that the low side FET 103 is set to be OFF KEEP and that the power outage signal is negated, and maintains the state until the power outage signal is asserted again. Therefore, the high side FET 102 and the low side FET 103 cannot be turned ON at the same time in the discharging mode.

Figure 7:
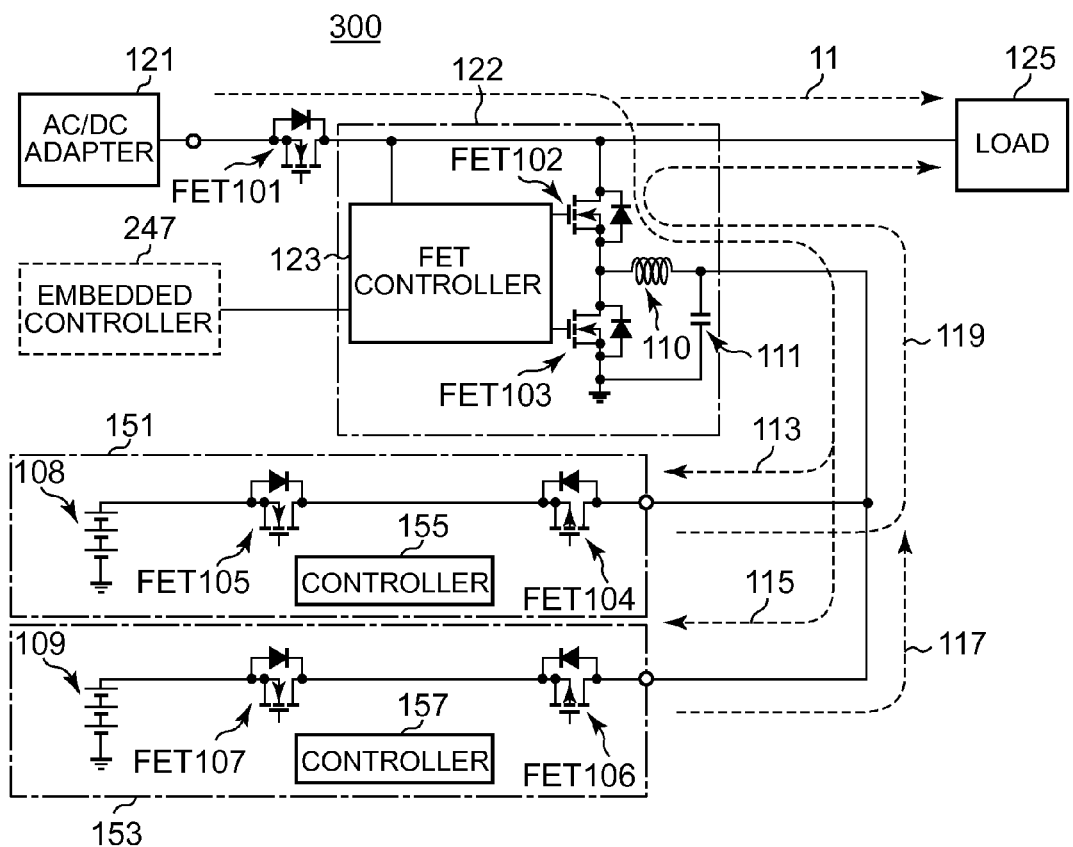
FIG. 7 is a block diagram showing another example of a power supply system.

FIG. 7 is a block diagram showing another embodiment of a power supply system. A power supply system 300 is different from the power supply system 100 shown in FIG. 4 in that the power supply system 100 is configured by battery packs 151 and 153 suitable for the Smart Battery System. The FETs 104 and 105, and the battery 108 are stored in a case to form the battery pack 151. While the FETs 106 and 107, and the battery 109 are stored in a case to form the battery pack 153. Controllers 155 and 157 which monitor the charging state and the discharging state, and operate a protection circuit are stored on the battery packs, respectively, so as to be able to communicate with the embedded controller 247. This embodiment has been described above by taking the case for example in which there exist two pieces of battery packs. However, the present invention can be applied to a power supply system including only one battery pack or more than two pieces of battery packs.

While the above discussion has focused on power supply systems for notebook PCs, the present invention may also be applied to a power supply system of other electronic devices which utilize chargable batteries.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. A system comprising:
   a power outage detection circuit which detects that an output voltage of a DC voltage source has been lowered, and outputs a power outage signal;
   a battery charger, directly coupled to the charing and discharging path to a load, comprising a switching element which adjusts the output voltage generated by the DC voltage source, in performing a switching operation, and is set to be ON KEEP in response to the power outage signal; and
   a battery which is charged by the battery charger and supplies the electric power to the load when the switching element is set to be ON KEEP;
   wherein the switching element comprises a high side FET and a low side FET which operate in a synchronous rectification method, and on condition that the low side FET is off, the high side FET is set to be ON KEEP in response to the power outage signal.

2. The system according to claim 1, wherein the battery charger comprises a diode in which an anode is connected to the battery side and a cathode is connected to the load side.

3. The system according to claim 1, wherein after the power outage signal is outputted and a predetermined delay time has elapsed, the high side FET is set to be ON KEEP.

4. An apparatus comprising:
   a power outage detection circuit which detects that an output voltage of a DC voltage source has been lowered, and outputs a power outage signal;
   a battery charger, directly coupled to the charing and discharging path to a load, including a switching element comprising a high side FET and a low side FET which operate in a synchronous rectification method, and the high side FET is set to be ON KEEP in response to the power outage signal;
   a first charge/discharge path connected to the output of the battery charger;
   a second charge/discharge path connected to the output of the battery charger;
   a first battery connected to the first charge/discharge path; and
   a second battery connected to the second charge/discharge path.

5. The apparatus according to claim 4, further comprising an FET which is connected between the DC voltage source and the load, and is set to be OFF when a discharge current flows from the first battery or the second battery to the load.

6. The apparatus according to claim 4, further comprising two FETs in which the first charge/discharge path and the second charge/discharge path are connected in series, respectively.

7. A system comprising:
an electronic device;
a power outage detection circuit which detects that an output voltage of a DC voltage source has been lowered, and outputs a power outage signal;
a battery charger, directly coupled to the charing and discharging path to a load, comprising a switching element which adjusts the output voltage generated by the DC voltage source, in performing a switching operation, and is set to be ON KEEP in response to the power outage signal; and
a battery which is charged by the battery charger and supplies the electric power to the load when the switching element is set to be ON KEEP;
wherein the switching element comprises a high side FET and a low side FET which operate in a synchronous rectification method, and on condition that the low side FET is off, the high side FET is set to be ON KEEP in response to the power outage signal.

8. The system according to claim 7, wherein the battery charger comprises a diode in which an anode is connected to the battery side and a cathode is connected to the load side.

9. The system according to claim 7, wherein after the power outage signal is outputted and a predetermined delay time has elapsed, the high side FET is set to be ON KEEP.

10. An apparatus comprising:
an electronic device;
a power outage detection circuit which detects that an output voltage of a DC voltage source has been lowered, and outputs a power outage signal;
a battery charger, directly coupled to the charing and discharging path to a load, including a switching element comprising a high side FET and a low side FET which operate in a synchronous rectification method, and the high side FET is set to be ON KEEP in response to the power outage signal;
a first charge/discharge path connected to the output of the battery charger;
a second charge/discharge path connected to the output of the battery charger;
a first battery connected to the first charge/discharge path; and
a second battery connected to the second charge/discharge path.

11. The apparatus according to claim 10, wherein the electronic device is a notebook computer.

12. The apparatus according to claim 11, wherein the first battery and the first charge/discharge path are held in the same case together to form a battery pack, and the battery pack is mounted on a bay of the notebook computer.

13. The apparatus computer according to claim 11, wherein the first battery is held in a case to form a battery pack, the battery pack is mounted on a bay of the notebook computer, and the first charge/discharge path is implemented on a main body of the notebook computer.

14. The apparatus according to claim 10, wherein the DC voltage source is an AC/DC adapter.

\* \* \* \* \*